July 1, 1969

C. A. LAUTER, JR 3,452,593

WIND SPEED INTEGRATION SYSTEM FOR USE
WITH PULSE-TYPE ANEMOMETERS

Filed Jan. 3, 1967

Sheet _1_ of 2

INVENTOR
CHARLES A. LAUTER, JR.

BY

ATTORNEY

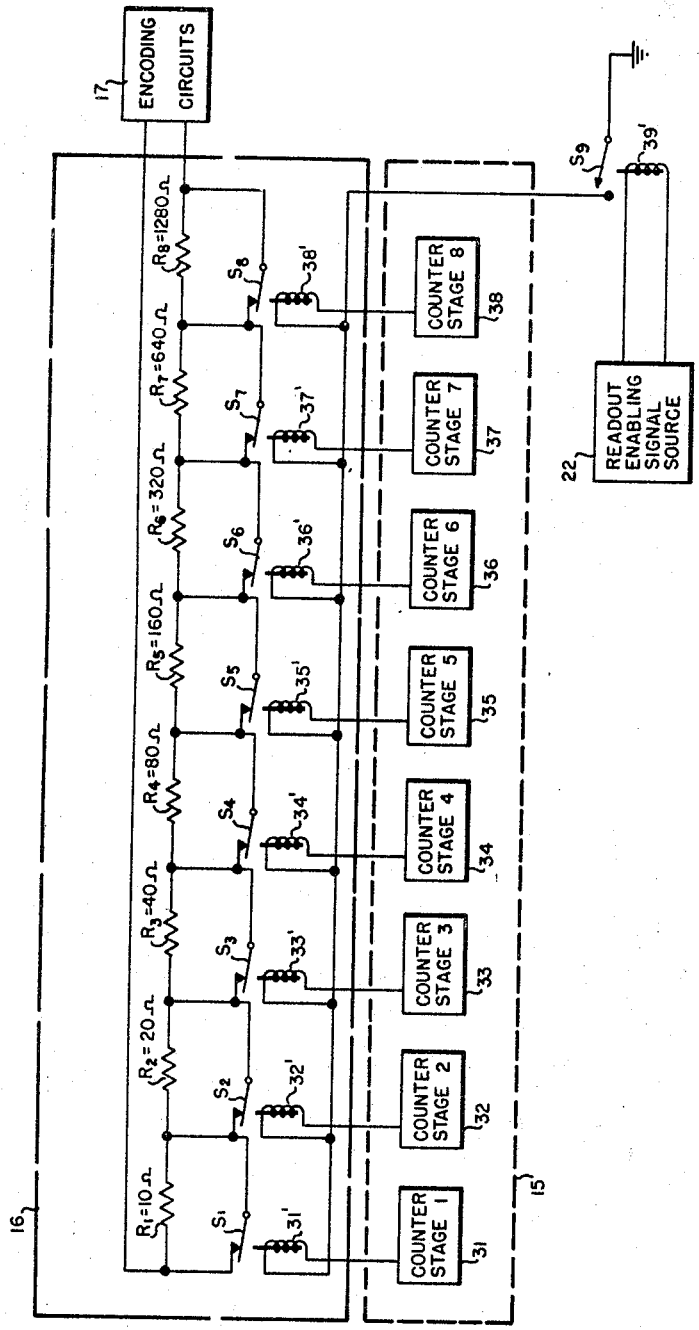

United States Patent Office 3,452,593
Patented July 1, 1969

---

3,452,593
WIND SPEED INTEGRATION SYSTEM FOR USE WITH PULSE-TYPE ANEMOMETERS
Charles A. Lauter, Jr., Oxon Hill, Md., assignor to the United States of America as represented by the Secretary of the Navy
Filed Jan. 3, 1967, Ser. No. 607,070
Int. Cl. G01k 1/02
U.S. Cl. 73—194          9 Claims

---

ABSTRACT OF THE DISCLOSURE

A system for integrating and storing the output of a pulse-type anemometer over a preselected time interval wherein the stored count is converted to an analog value proportional to average wind speed which is applied to the input of an encoding system.

---

Figure 1:
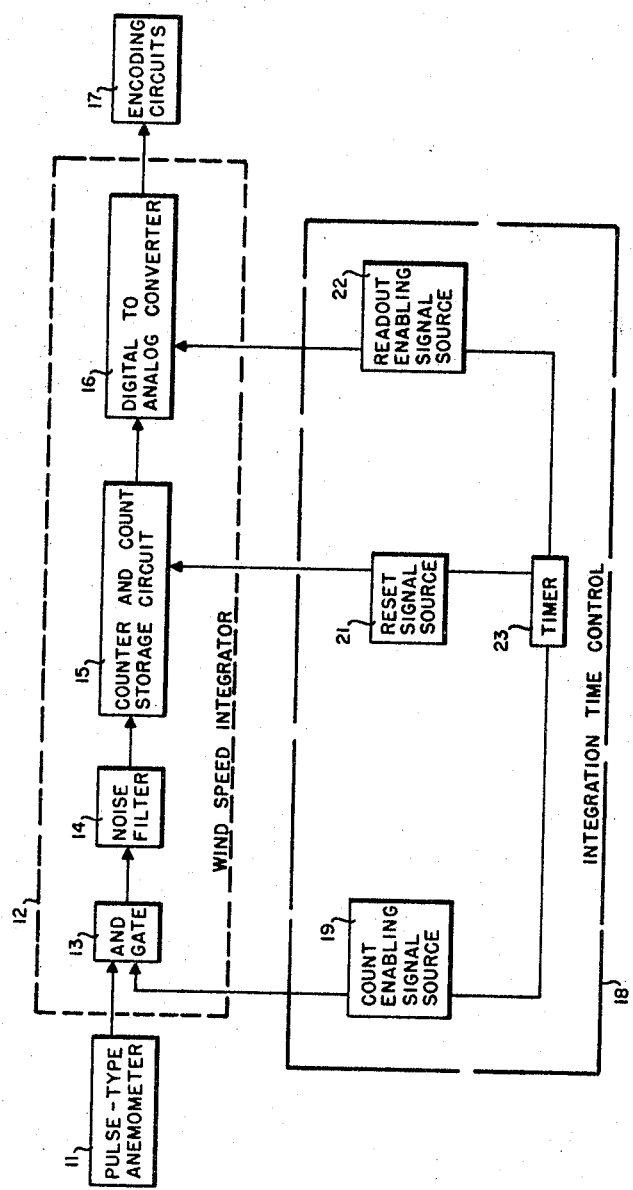

The invention described herein may be manufactured and used by or for the Government of the United States of America for governmental purposes without the payment of any royalties thereon or therefor.

The present invention relates to a wind speed integrator and more particularly to a wind speed integrator for use with pulse-type anemometers wherein the pulse rate output of the pulse-type anemometer is integrated over a set period, stored and then converted to an analog value for use in meteorological systems, such as meteorological telemeters.

In the field of wind speed integration it has been a general practice to employ mechanical counters and electronic analog integrators to integrate wind speed over a specified period of time. Although such devices have served the purpose, they have not proved entirely satisfactory under all conditions of service. For example, the use of a mechanical integrator to integrate wind speed over a specified period of time proves undesirable because of required routine maintenance and unreliability. The use of electronic analog integrators has shown that it is difficult to achieve good accuracy over a wide temperature range due to the large integration time which is usually required. Additionally, because the output is not isolated the type of equipment with which it may be used is limited.

Therefore, the general purpose of this invention is to provide a wind speed integrator for use with pulse-type anemometers which is adapted for use in unmanned or automatic weather telemetry equipment and which embraces all the advantages of similarly employed wind speed integrators while possessing none of the aforedescribed disadvantages. To obtain this the present invention contemplates a unique system arrangement whereby the output of a pulse-type anemometer is counted over a time interval and stored for future use, at which time the count is converted to an analog output, which is isolated both from ground and from the power supplies of the counter so as to permit the use of the analog output with encoding circuits, e.g. telemeter circuits, which are often isolated themselves and so require isolated inputs. Of course, if a digital output is desired the step of digital to analog conversion may be eliminated, but this step will be included in the discussion infra. The invention provides a wind speed integrator system which is specifically designed for use in remote and unmanned weather stations and provides a number of advantages which are important for successful operation in such an environment. This invention provides for low power consumption, wide operating temperatures, no routine maintenance, no calibration, high reliability, long life, high accuracy and the ability to store information until needed without limitations on the length of storage time.

An object of the present invention is to provide a wind speed integrator for use with pulse-type anemometers.

Another object is to provide such an integrator wherein the output of the pulse-type anemometer is integrated over a specified period of time and wherein this information is stored for future use.

A further object of the invention is to provide a wind speed integrator system wherein the stored information is made available to an encoding or telemetering system in analog form.

Other objects and features of the invention will become apparent to those skilled in the art as the disclosure is made in the following description of a preferred embodiment of the invention as illustrated in the accompanying sheets of drawings and in which:

FIG. 1 shows, in block diagram form, a preferred embodiment of the invention; and FIG. 2 illustrates, partly in schematic and partly in block diagram form, a more detailed portion of the system shown in FIG. 1.

Referring now to the drawings, there is shown in FIG. 1 a pulse-type anemometer 11, the output of which is coupled to the input of the wind speed integrator 12, and more specifically to the input of AND gate 13. The AND gate 13 is coupled through noise filter 14 to the solid state counter and count storage circuit 15, which may be a binary counter employing transistor multivibrators. This, in turn, is coupled to the digital to analog converter 16. The output of the digital to analog converter 16, which is also the output of the wind speed integrator 12, is then coupled to encoding circuits 17, which may be any one of a number of known systems such as a telemeter multiplexer and encoder for remote recording of the average wind speed. In addition, an integration time control 18 is coupled to the wind speed integrator 12. More specifically, a count enabling signal source 19 is coupled to a second input of AND gate 13; reset signal source 21 is coupled to the solid state counter and count storage circuit 15; and readout enabling signal source 22 is coupled to the digital to analog converter 16. In most cases these signal sources 19, 21 and 22 will be a part of the telemeter 17, but in the event a telemeter is not used a timer 23 may be used to control these sources.

In the operation of the system of this invention a series of pulses, the frequency of which is proportional to instantaneous wind speed, are applied to one input of the AND gate 13 by the anemometer 11. During the period of time in which it is desired to integrate wind speed, the count and enabling signal source 19, which is a part of the integration time control 18, provides an enabling signal to the second input of AND gate 13. As a result, the pulses from anemometer 11 pass through AND gate 13 and into noise filter 14, the purpose of which is to prevent any noise, such as anemometer contact bounce, from triggering the solid state counter 15. It is clear that in the absence of such a noise filter such extraneous noise could trigger the counter thus resulting in an inaccurate indication of average wind speed.

At the end of the time period during which it is desired to integrate wind speed the count enabling signal source 19 is inactivated, thus inactivating AND gate 13 which prevents the further acceptance of pulses from anemometer 11 by wind speed integrator 12. At the end of the integration period when the pulses from anemometer 11 are prevented from entering the counter 15 the count is frozen in the solid state counter and can be stored indefinitely for future use.

When the utilization of this count is desired the readout enabling signal source 22 of the integration time control 18 enables the digital to analog converter 16 which then converts the digital count to an isolated analog form that is compatable with the encoding system 17, e.g. a telemeter multiplexer and encoder. After the short time period required for the analog information to be transmitted to the encoding system 17, the readout enabling signal source is turned off, either by the telemeter or by timer 23. Just prior to the time when the count enabling signal source 19 is activated, the reset signal source 21 is activated so as to reset the counter 15 to zero, thus preparing it to receive the count during the next integration period.

Depending upon whether the information obtained from the wind speed integrator system is to be used locally, as in a manned weather station, or at a point remote from the location of the wind speed integrator system, as in the case of an unmanned weather station, the encoding system 17 may be any one of a number of known memory type display devices or may be a telemeter multiplexer and encoder. Similarly, the integration time control 18 may be a part of the telemetering system, or if a telemetering system is not used the integration time control 18 may be separate and conventional timing circuits as shown in FIGURE 1.

Referring now to FIG. 2 there is shown a specific embodiment of the digital to analog converter 16 wherein the counter and count storage circuit 15 is shown, for the purpose of explanation, to have eight counter stages 31–38. Each of the counter stages 31–38 is coupled to a respective relay coil 31' through 38' while the other end of each of the coils 31' through 38' is coupled to readout enabling signal source 22. A plurality of resistors $R_1$ through $R_8$, in turn, are coupled in series with each other across encoding circuits 17. In addition, each of the resistances $R_1$ through $R_8$ is bypassed by its respective relay contact $S_1$ through $S_8$, which contacts are normally closed so as to bypass the resistances when no readout to the encoding circuits 17 from the converter 16 is desired. Conversely, when readout is desired the readout enabling signaling source 22, which may be controlled by timer 23, or by the telemeter or encoding circuits 17, energizes relay coil 39' thus closing the relay contact $S_9$ so as to ground each of the relay coils 31' through 38'. Then if the counter stage associated with a particular relay coil e.g. one of the coils 31' through 38' is in the "1" state the respective relay coil associated with that counter stage will be energized so as to attract its respective relay contact. When the relay contact is attracted by its respective relay coil the resistor which is normally bypassed by the relay contact is no longer bypassed and is effectively coupled to the encoding circuits 17.

In this manner each of the relays 31' through 38' when energized, adds a predetermined amount of resistance to the output which is completely isolated from ground and from the power supplies of the counter. The value of each of the resistors $R_1$ through $R_8$ is determined by the equation $R = K2^{N-1}$ where R is the value of the resistance in ohms, K is a factor that determines the maximum value of resistance that the output will have, and N is the number of the counterstage with which each particular resistor is associated. In addition, the value of K is determined by the equation $$K = \frac{R_{Max.}}{_2N'-1}$$

where $R_{Max}$ is the desired resistance value for full count and N' is the number of the last counting stage, e.g. the number 8 for the example shown in FIG. 2. Although the resistances $R_1$ through $R_8$ are shown to be specific values which are binarally weighted it should be understood that this is merely for the purpose of explanation and that the values of the resistors must be determined by means of the equations set forth supra and that these values are dependent upon the number of counter stages used and the maximum resistance desired. In addition, it should be understood that the relay coil 39' and control $S_9$ are shown merely for the purpose of explanation and that other switching means may be employed, e.g. transistor switching devices, etc.

The system of this invention provides for a highly reliable wind speed integration system for use with pulse-type anemometers which requires no routine maintenance and no calibration. This system has the capability of measuring wind speed over a specified time period and of storing this information for an indefinite interval until the utilization of the information is desired. This system also provides for the conversion of this wind speed information, which is stored in digital form, to an isolated analog form which is compatable with known telemetering or encoding systems that often require isolated inputs. This invention is particularly adaptable for use in unmanned weather stations wherein the desirable wind speed information is transmitted by means of a telemetering system to a point remote from the unmanned weather station, and with the advent of the use of satellite for the recording of weather information, this wind speed integration system may telemeter its information to a satellite which in turn can send the information to a ground station. This system can be particularly useful when located in weather buoys throughout the oceans of the world by eliminating the need for reliance upon ships in the obtaining of such weather information.

What is claimed and desired to be secured by Letters Patent of the United States is:

1. A pulse type anemometer system for measuring and integrating wind speed over preselected time intervals comprising:
   a pulse type anemometer;
   a solid state counter and count storage circuit coupled to said anemometer to count pulses from said anemometer over a preselected time interval and to store the count;
   a digital to analog converter coupled to said counter and count storage circuit;
   encoding circuits coupled to said converter, wherein said encoding circuits include a telemeter multiplexer and encoder to enable the transmission of wind speed information to a remote point; and
   an integration time control coupled to said counter, said count storage circuit, and said converter thereby to enable the sequential counting, storage and conversion to an isolated analog value of said pulses in response to a command from said remote point.

2. The system of claim 1 including a gate circuit associated between said anemometer and said counter circuit to control the admission of said pulses to said counter circuit.

3. The system of claim 2 wherein said gate circuit is an AND circuit.

4. The system of claim 2 wherein said integration time control includes a count enabling signal source operative with said gate circuit to control the length of integration periods.

5. The system of claim 2 wherein said integration time control includes a reset signal source associated with said counter and count storage circuit to reset the counter to zero prior to the commencement of each integration period.

6. The system of claim 2 wherein said integration time control includes a readout enabling signal source associated with said converter to enable said converter to change the count stored by said counter and count storage circuit to an analog value.

7. The system of claim 1 wherein said counter and count storage circuit includes a solid state binary counter.

8. A pulse type anemometer system for measuring and integrating wind speed over preselected time intervals comprising:
   a pulse type anemometer;

a solid state counter and count storage circuit coupled to said anemometer to count pulses from said anemometer over a preselected time interval and to store the count;

a gate circuit coupled between said anemometer and said counter circuit to control the admission of said pulses to said counter circuit;

a noise filter coupled between said gate circuit and said counter circuit to prevent erratic operation of said counter circuit;

a digital to analog converter coupled to said counter and count storage circuit;

encoding circuits coupled to said converter; and an integration time control coupled to said counter, said count storage circuit, and said converter thereby to enable the sequential counting, storage and conversion to an isolated analog value of said pulses.

9. A pulse type anemometer system for measuring and integrating wind speed over preselected time intervals comprising:

a pulse type anemometer;

a solid state counter and count storage circuit coupled to said anemometer to count pulses from said anemometer over a preselected time interval and to store the count;

a digital to analog converter including a plurality of resistors coupled together in series arrangement;

an equal number of normally closed relay contacts, one each associated with each of said resistors to normally shunt said resistors; and an equal number of relay coils associated with the contacts, the counter and the integration time control;

said counter and said integration time control being coupled to said relay coils to periodically energize the coils so as to open a predetermined number of said relay contacts and to effectively remove the shunts from across a predetermined number of said resistances;

encoding circuits coupled to said converter; and an integration time control coupled to said counter, said count storage circuit, and said converter thereby to enable the sequential counting, storage and conversion to an isolated analog value of said pulses.

References Cited

UNITED STATES PATENTS

| | | | |
|---|---|---|---|
| 2,988,737 | 6/1961 | Schroeder | 73—517 XR |
| 3,079,795 | 3/1963 | Kowallis. | |
| 3,316,761 | 5/1967 | Frith et al. | 73—189 |
| 3,330,155 | 7/1967 | Miville | 73—189 |
| 3,336,802 | 8/1967 | Von Wald et al. | 73—189 |

CHARLES A. RUEHL, *Primary Examiner.*

U.S. Cl. X.R.

73—229; 235—151.34